March 25, 1947.  E. A. RICHARDS ET AL  2,417,839
MANUFACTURE OF RECTIFIER DISCS
Filed Nov. 20, 1943  2 Sheets-Sheet 1

Inventors.
Edward Arthur Richards.
Leslie James Ellison.
By Frank Guy.
Geo. J. Hyde
Attorney March 25, 1947. E. A. RICHARDS ET AL 2,417,839
MANUFACTURE OF RECTIFIER DISCS
Filed Nov. 20, 1943 2 Sheets-Sheet 2
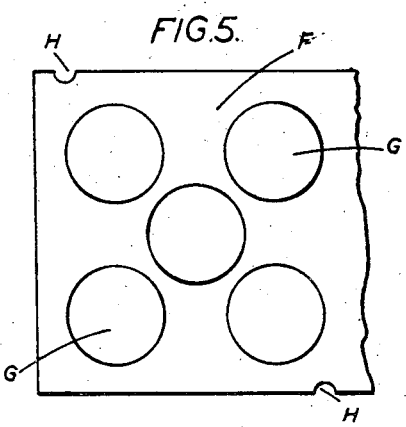
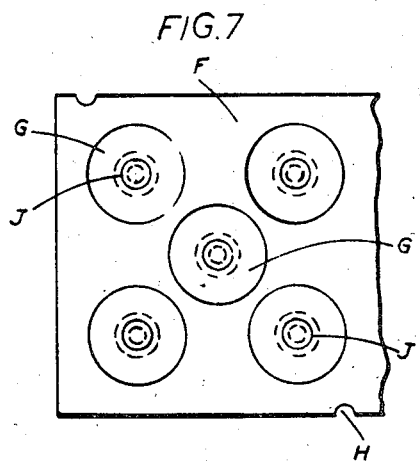
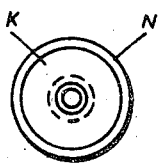
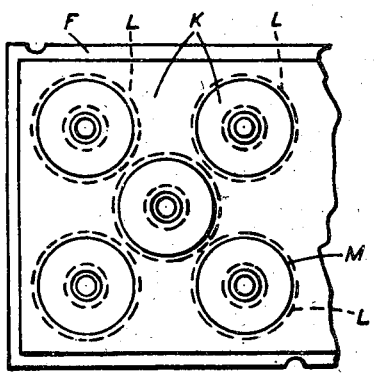
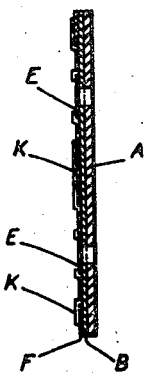
Inventors
Edward Arthur Richards
Leslie James Ellison
Frank Gray
By Geo. J. Hyde
Attorney Patented Mar. 25, 1947

2,417,839

UNITED STATES PATENT OFFICE 2,417,839

MANUFACTURE OF RECTIFIER DISCS

Edward Arthur Richards, Leslie James Ellison, and Frank Gray, London, England, assignors, by mesne assignments, to International Standard Electric Corporation, New York, N. Y., a corporation of Delaware Application November 20, 1943, Serial No. 511,102
In Great Britain December 3, 1942

4 Claims. (Cl. 175—366)

This invention relates to improvements in the manufacture of rectifier elements such as selenium rectifier discs which consist of a base plate of metal coated with a semi-conductor to which a counter-electrode is applied, and consists in a method whereby small rectifier elements may be cut or blanked out from larger elements or sheets.

Various proposals have already been made for blanking out rectifier elements from such sheets, but if the blanking-out is done after the counter-electrode metal has been applied there is a danger of a short circuit occurring at the edges between the counter-electrode and the base plate due to the blanking or cutting operation, and it is one of the objects of the present invention to provide a process in which this danger is largely eliminated. The invention will be described as applied to the manufacture of the so-called centre-contact type of rectifier disclosed in British Patent No. 526,482, but it will be understood that it is not in any way limited to the manufacture of such rectifiers.

The present invention provides a process for the manufacture of rectifier elements by cutting or blanking them out from a relatively large sheet-metal base plate provided with a layer of rectifying material, which process comprises protecting the parts which will subsequently form the edges of the elements to be cut from the base plate by paper or other thin and readily cut material (hereinafter referred to as "paper") applied to the layer of rectifying material, applying the counter-electrode metal over the plate to coat the paper and the exposed surfaces of the rectifying material on the base plate, cutting through the paper and the base plate to leave a peripheral strip of paper around the cut edges and finally removing the peripheral strips of paper to leave the edges of the elements free from counter-electrode metal and thus reduce any possibility of a short circuit between the counter-electrode and the base plate.

The paper may be in the form of an apertured mask having holes corresponding to the elements to be cut, and in the case of apertured elements paper discs may be applied to the plate at those positions where the apertures are to occur. The paper is preferably adhesive and is stuck direct to the rectifier surface of the plate.

One of the features of the present invention is that after the application of the counter-electrode metal the whole plate may be subjected to an electrical forming process before the separate rectifier elements are cut therefrom, since all the elements are electrically connected through the counter-electrode metal extending over the paper mask, thus effecting a considerable economy in the time of manufacture. A further advantage is that the paper confines the current flowing during the electrical forming process to the portions of the plate which will subsequently be made into rectifier discs. This effects an economy in the electric power required and shortens the forming time.

In the manufacture of apertured discs the holes may be provided in the plate before the application of the counter-electrode metal, and in this case their edges may be protected by individual masking pins inserted in the holes before the counter-electrode metal is applied.

The above and other features of the invention will be hereinafter described with reference to the accompanying drawings, which illustrate the manufacture of the so-called centre-contact type of selenium rectifiers. In these drawings—

Fig. 5 is a view of the paper mask;

Fig. 6 shows a mushroom-shaped pin for masking the centre holes;

Fig. 7 shows the plate with the paper mask and mushroom pins in position;

Fig. 8 shows the plate before the blanking operation after being coated with counter-electrode metal;

Fig. 9 is a sectional view of same;

Fig. 10 shows one of the rectifier discs produced by blanking from the plate; and Fig. 11 shows the ring of paper which is removed from the disc after blanking.

Figure 1:
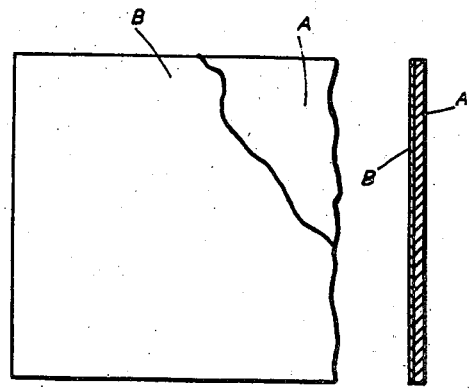
Fig. 1 is a plan view of a portion of a selenium coated base plate with a portion of the coating removed.
Figure 2:
Fig. 2 is a sectional elevation thereof.

A sheet of metal forming a base plate A is first coated with selenium B over the whole of one surface and the appropriate heat treatment is applied to convert the selenium to the alpha modification. A portion of the coated plate is shown in Figs. 1 and 2 in plan and sectional elevation.

Figure 3:
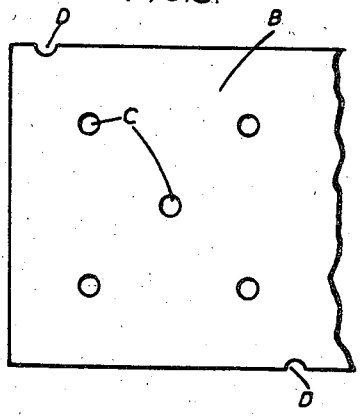
Fig. 3 shows the plate pierced with centre holes and locating notches.
Figure 4:
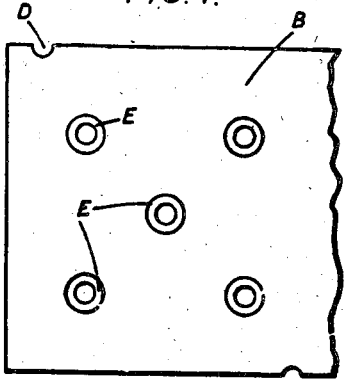
Fig. 4 shows the plate with a coating of insulating material around the centre holes.

The coated plate is then pierced as shown in Fig. 3 with a number of holes C which will become the centre holes of the discs which are ultimately to be punched from the coated sheet. At the same time holes or notches D are made in the edges of the sheet to provide locating points for subsequent operations. If the discs are to be of the centre-contact construction described in British Patent No. 526,482, the plate is then covered by a mask (not shown) provided with holes of a diameter larger than the holes in the sheet and a suitable insulating varnish or enamel is sprayed on to the portions of the sheet thus exposed. The appearance of the plate at this stage is shown in Fig. 4 in which E are the rings of insulating enamel. If the discs are not to be of the centre-contact construction, the layer of enamel is not required, but the subsequent operations remain as described.

The sheet then passes through a further heat treatment which converts the selenium to the beta form and at the same time bakes the enamel to the required degree of hardness.

A paper mask F shown in Fig. 5 provided with holes G having a diameter equal to the outside diameter of the working surface of the finished disc is then secured to the selenium surface of the plate by a suitable adhesive. The mask is located by the notches H, so that the holes in the mask are concentric with the centre holes already pierced in the plate. The masks are preferably made from adhesive paper which can be stuck direct on to the plate.

A mushroom-shaped mask J as shown in Fig. 6 is then placed in each of the centre holes and the whole surface of the plate and the paper mask is sprayed with an alloy which forms the counter-electrode for the rectifier discs. The appearance of the plate before spraying is shown in Fig. 7 and the finished plate ready for blanking is shown in plan and section in Figs. 8 and 9 respectively. It will be noticed that the edges of the plate are masked during spraying to prevent the possibility of a short-circuit between the counter-electrode and the metal base. The counter-electrode is indicated at K. The mushroom-shaped masks J protruding through the base plate A can easily be removed either manually by pushing them upwards through the center hole or by any device suitable for the removing process.

The whole plate is now formed electrically to increase the reverse resistance, all the separate discs being connected in parallel by the layer of metal which covers the paper mask.

The plate is then put in a press and located by the notches D. A tool with a diameter somewhat greater than the holes in the paper mask punches out discs from the plate as indicated by the dotted circles L in Fig. 8. Each disc is therefore punched with a ring of paper M at the outside edge and on removing this paper the disc is left with a ring N of exposed selenium which provides the necessary insulation between the counter-electrode and the metal base. The finished disc is shown in Fig. 10 and the paper ring in Fig. 11.

It will be understood that the rectifiers need not be circular in shape. They may, for instance, be square or rectangular and may be produced from the plate by a cutting or shearing operation without departing from the spirit of the invention. Furthermore, it will be understood that the invention is not restricted to the production of rectifiers with an aperture for mounting on a spindle or to the so-called centre-contact type of rectifier.

What is claimed is:

1. A process of manufacturing a plurality of selenium rectifier elements from a base plate provided with a selenium coating which comprises the following steps: punching out a plurality of holes corresponding to the holes in the elements to be made, applying insulating enamel to the selenium coating to cover a small area around each hole, subjecting the base plate to heat treatment to convert the selenium to its rectifying condition and to bake the enamel, applying an adhesive paper mask having holes slightly smaller than the elements to be produced to the selenium coating, inserting masking pins in the holes, spraying the base plate with counter-electrode metal covering the mask and the exposed selenium surfaces, subjecting the base plate thus coated to an electrical forming process, severing the elements with a peripheral rim of paper and finally removing said rim of paper leaving the edges of the elements free from counter-electrode metal.

2. A process for the manufacture of a plurality of rectifier elements by applying a layer of rectifying material to a metal sheet adapted to form the base plates of such elements, applying a layer of rectifying material to the sheet, applying counter-electrode metal to the rectifying material and subsequently severing individual rectifying elements from said sheet, which comprises applying to the rectifying material prior to application of the counter-electrode metal a mask of sheet material covering marginal areas of said elements, applying said metal to the exposed portions of said material and the intervening portions of said mask to form a continuous conducting sheet, and electro-forming said elements by passing a current between said counter-electrode sheet and base plate sheet prior to the severing of said elements, severing the elements with a peripheral rim of the mask, and finally removing said rim of the mask leaving the edges of the elements free from counter electrode metal.

3. A process of manufacturing a plurality of selenium rectifier elements from a base plate provided with a selenium coating which comprises the following steps: punching out a plurality of holes corresponding to the holes in the elements to be made, applying insulating material to the selenium coating to cover a small area around each hole, subjecting the base plate to heat treatment to convert the selenium to its rectifying condition, applying a paper mask having holes slightly smaller than the elements to be produced to the selenium coating, inserting masking pins in the holes, spraying the base plate with counter-electrode metal covering the masks and the exposed selenium surfaces, subjecting the base plate thus coated to an electrical forming process, severing the elements with a peripheral rim of paper and finally removing said rim of paper leaving the edges of the elements free from counter-electrode metal.

4. A process for the manufacture of rectifier elements by severing them from a sheet-metal base plate provided with a plurality of holes corresponding to the holes of the elements to be made and further provided with a layer of rectifying material, which comprises protecting the parts which will subsequently form the edges of the elements to be cut from the base plate by use of masking material applied to the layer of rectifying material, leaving the adjacent central surfaces exposed, and in which the said holes are masked by inserts, applying counter-electrode metal over the plate to coat the said masks and exposed surfaces of the rectifying material on the base plate, cutting through the masking material and the base plate to leave a peripheral strip of masking material around the cut edges, and finally removing the peripheral strips and the said center inserts, thereby leaving the edges of the elements free from counter-electrode metal.

EDWARD ARTHUR RICHARDS.
LESLIE JAMES ELLISON.
FRANK GRAY.

REFERENCES CITED

The following references are of record in the file of this patent:

UNITED STATES PATENTS

| Number | Name | Date |
|---|---|---|
| 2,235,051 | Thompson | Mar. 18, 1941 |
| 2,244,664 | Addink et al. | June 10, 1944 |
| 2,359,377 | Miller et al. | Oct. 3, 1944 |
| 2,327,511 | DeLange et al. | Aug. 24, 1943 |
| 2,345,122 | Hermann | Mar. 8, 1944 |